United States Patent
Xiong et al.

(10) Patent No.: US 8,378,814 B2
(45) Date of Patent: Feb. 19, 2013

(54) ALLOCATING METHOD OF MOVING AREA LIST OF USER EQUIPMENT AND CORRESPONDING APPARATUS

(75) Inventors: Chunshan Xiong, Beijing (CN); Yihua Jiang, Beijing (CN); Huarui Liang, Beijing (CN); Hui Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 508 days.

(21) Appl. No.: 12/673,325

(22) PCT Filed: Aug. 15, 2008

(86) PCT No.: PCT/CN2008/001479
§ 371 (c)(1), (2), (4) Date: Mar. 10, 2010

(87) PCT Pub. No.: WO2009/024025
PCT Pub. Date: Feb. 26, 2009

(65) Prior Publication Data
US 2011/0210845 A1 Sep. 1, 2011

(30) Foreign Application Priority Data
Aug. 15, 2007 (CN) .......................... 2007 1 0120319

(51) Int. Cl.
*G08B 1/08* (2006.01)
(52) U.S. Cl. ................................................. 340/539.13

(58) Field of Classification Search ............. 340/539.13, 340/686.1, 991, 992, 426.19, 13.24; 455/456.1, 455/404.2
See application file for complete search history.

(56) References Cited

U.S. PATENT DOCUMENTS

| | | | |
|---|---|---|---|
| 7,860,517 B1 * | 12/2010 | Patoskie et al. ............ | 455/456.1 |
| 2007/0026871 A1 * | 2/2007 | Wager ........................ | 455/456.1 |
| 2007/0275707 A1 * | 11/2007 | Kwak et al. ................ | 455/414.2 |
| 2008/0268842 A1 * | 10/2008 | Herrero-Veron ........... | 455/435.1 |

FOREIGN PATENT DOCUMENTS

| | | |
|---|---|---|
| CN | 1972514 A | 5/2007 |
| KR | 20070081050 A | 8/2007 |
| WO | WO2007089560 A1 | 8/2007 |
| WO | WO2008082193 A1 | 7/2008 |

OTHER PUBLICATIONS

International Search Report for International Application No. PCT/CN2008/001479, dated Nov. 27, 2008.

* cited by examiner

*Primary Examiner* — Phung Nguyen
(74) *Attorney, Agent, or Firm* — Barnes & Thornburg LLP

(57) ABSTRACT

A method of allocating the moving area list of user equipment which relating to wireless communication technology. Interacting signaling between network and UE is reduced. The utilization efficiency of network resource is enhanced. The method includes, receiving the area ID which is pre-defined from UE, acquiring the history information of the last allocated moving area list from the mobility management entity (MME) which allocated the last moving area list, allocating new moving area list according to the history information and the received area ID. Accordingly, a MME and UE are disclosed.

15 Claims, 2 Drawing Sheets

○ Tracking Area

- - → Movement Track of UE

ALLOCATING METHOD OF MOVING AREA LIST OF USER EQUIPMENT AND CORRESPONDING APPARATUS

CROSS-REFERENCE TO RELATED APPLICATIONS

The present application claims the benefit of priority to International Patent Application No. PCT/CN2008/001479 filed 15 Aug. 2008, which further claims the benefit of priority to China Patent Application No. 200710120319.8 filed 15 Aug. 2007, the contents of which are incorporated herein by reference in their entirety.

FIELD OF THE INVENTION

The present invention relates to wireless communication technologies in the field of communications, and particularly to a method for allocating a tracking area list of a User Equipment, a Mobility Management Entity and a User Equipment.

BACKGROUND OF THE INVENTION

In a mobile communication system, the mobility management of a User Equipment (UE) is a fundamental and necessary logical function of the mobile communication network.

For the purpose of addressing and identifying the UE in the mobility management, a Core Network (CN) divides a network into a series of areas in terms of logical architecture, and allocates a separate identity for each of the areas. Depending on the division criteria, the network is divided into different areas, including, for example, a Tracking Area (TA) and a Routing Area (RA) provided with a Tracking Area Identity (TA ID) and a Routing Area Identity (RA ID) respectively.

For the sake of simplification, the reference to an area below is made by taking the Tracking Area as an example.

The Core Network allocates a specific area (which is indicated by at least one TA ID) for a DE attached to the network, and when the DE moves from the current allocated area to an unallocated area, the UE initiates the TA Update procedure to the network.

A Mobility Management Entity (MME) in the Core Network is responsible for the mobility management of the UE, and the MME includes, but not limited to a Mobile Switching Center (MSC), a Serving GPRS Support Node (SGSN), and a signaling terminating node at a non-access layer of a core network of the Evolved Packet System (EPS) of the Third Generation Partnership Project (3GPP).

The Core Network includes a plurality of MMEs, each of which manages a certain range of areas, that is, each MME manages a limited range of areas. It is possible for a UE to move out of an area allocated by the current MME to the UE, and further move out of the entire areas managed by the current MME.

In the traditional 3G mobile communication system, since the MME allocates to the UE a single TA ID, i.e. one TA, the UE may traverse multiple TAs within a short period of time when moving at a high speed, as a result, multiple TA update procedures are caused, signaling exchanged between the network and the UE is increased greatly, and network resources are wasted.

In view of the above, an MME allocates a TA List containing multiple TA IDs to a UE in the 3GPP EPS system. Since the TA List includes multiple TA IDs, the range of areas allocated for the UE is increased, so that the TA updates during the movement of the UE are reduced and the utilization of the network resources are improved.

To allocate a TA List for the UE, it is necessary for the MME to determine as possible the area that the UE is moving to so that an appropriate TA List is allocated to the UE in order to reduce as possible the location updates caused during the fast movement of the UE.

At present, however, the MME allocates a new TA List for the UE based on a single TA ID in the original TA List that is sent by the UE, which is insufficient for the MME to allocate a new appropriate TA List for the UE. Therefore, the areas allocated by the MME for the UE are possibly inappropriate and multiple location updates are caused during the fast movement of the UE, thus, a large amount of signaling is still exchanged between the network and the UE, and the network processing resources are still wasted.

SUMMARY OF THE INVENTION

Embodiments of the invention provide a method and apparatus for allocating a Tracking Area List for a User Equipment, to reduce the amount of signaling exchanged between the network and the User Equipment and improve the utilization of network resources.

An embodiment of the invention provides a method for allocating a new Tracking Area List for a User Equipment, including: receiving a designated Tracking Area Identity from the User Equipment; obtaining history information when old Tracking Area List is allocated from an old Mobility Management Entity allocating the old Tracking Area List; and allocating a new Tracking Area List for the User Equipment according to the obtained history information and the received Tracking Area Identity.

An embodiment of the invention provides a Mobility Management Entity, including: a Tracking Area Identity receiving unit adapted to receive a designated Tracking Area Identity from a User Equipment; a history information obtaining unit adapted to obtain history information when the old Tracking Area List is allocated from an old Mobility Management Entity allocating the old Tracking Area List; and a Tracking Area List allocating unit adapted to allocate a new Tracking Area List for the User Equipment according to the obtained history information and the received Tracking Area Identity.

An embodiment of the invention provides a User Equipment including: a receiving unit, which is adapted to receive a Tracking Area Identity of the Tracking Area where the User Equipment is currently located, and receive a Tracking Area List allocated by a Mobility Management Entity; a Tracking Area List information storage and update unit, which is adapted to store and update the Tracking Area List allocated by the Mobility Management Entity according to the Tracking Area List received by the receiving unit; a Tracking Area Identity storage and update unit, which is adapted to store and update a Tracking Area Identity of the Tracking Area where the User Equipment is currently located according to each Tracking Area Identity received by the receiving unit, during the movement of the User Equipment within Tracking Areas covered by the current allocated Tracking Area List; and a sending unit, which is adapted to send to the Mobility Management Entity the Tracking Area Identity stored and updated by the Tracking Area Identity storage and update unit.

In embodiments of the invention, the history information when the old TA List is allocated is added to the UE Context of the old MME allocating the old TA List, and the specific TA ID is sent by the UE to the new MME which is to allocate a new TA List, so that the movement direction and movement speed of the UE is estimated appropriately based on the history information and the TA ID during the allocation of a new TA List, thus an appropriate TA List is allocated to the UE, thereby reducing the amount of signaling exchanged between the network and the UE and improving the utilization of network resources.

DETAILED DESCRIPTION OF THE EMBODIMENTS

Figure 1:
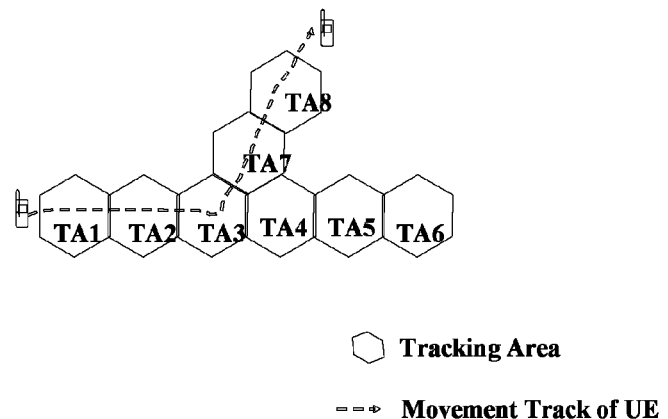
FIG. 1 is a schematic diagram showing a TA List according to an embodiment of the invention.

As can be seen from the discussion in the background, to allocate a relatively appropriate Tracking Area List for a UE, an MME is required to estimate the area that the UE is heading for and the movement speed of the UE. At present, however, depending on one TA ID is sent by the UE, the MME cannot satisfy the requirements of estimating the area that the UE is heading for and the movement speed of the UE and then allocating an appropriate Tracking Area List for the DE. Therefore, in an embodiment of the invention, in order to allocate an appropriate new Tracking Area List for the UE, some history information of the old allocated Tracking Area List (i.e. the Tracking Area List allocated for the UE just before any new Tracking Area List is allocated) is respectively stored in the old MME and the UE, enabling the new MME to estimate the area that the UE is heading for and the movement speed of the UE, thereby reducing the amount of signaling exchanged between the UE and network side during the fast movement of the UE and improving the utilization of the network resources.

Preferably, given that the old MME which has allocated the old Tracking Area List for the UE is denoted by MME 1 and the new MME which allocates a subsequent new Tracking Area List for the UE is denoted by MME 2, MME 1 and MME 2 may be physically the same MME or different MMEs. During the mobility management, which may include for example a TA update procedure and an attachment procedure, when the UE accesses MME 2, the UE provides a TA ID from its old Tracking Area List for MME 2; in this case, MME 2 receives the TA ID provided by the UE, obtains the UE Context from MME 1, and allocates a new Tracking Area List for the DE based on the TA ID provided by the UE and the UE Context obtained from MME 1. In view of this, in an embodiment of the invention, some additional history information when the old Tracking Area List is allocated is stored by MME 1 in the UE Context in MME 1, and the TA ID sent by the UE to the MME 2 is further defined, to thereby enable MME 2 to allocate a relatively appropriate new Tracking Area List for the UE based on the history information in the UE Context and the further defined TA ID.

The implementation, embodiments and corresponding beneficial effects of the solution of the invention are described below in detail in connection with the Drawings.

An implementation of the invention includes: receiving a designated TA ID sent by a UE; obtaining history information when the old Tracking Area List is allocated from the old Mobility Management Entity which has allocated the old Tracking Area List; and allocating a new Tracking Area List for the UE based on the obtained history information and the received TA ID.

The history information refers to such information that is used for determining the area traversed by the UE, the movement speed of the UE, the direction in which the UE is moving, and so on, and includes, but not limited to the old allocated Tracking Area List (the following description is given by taking the TA List as an example), the time when the old TA List is allocated, the TA ID of the TA where the UE is located when the old TA List is allocated, and so on.

Further, since the TA ID received by the new MME in the prior art is disadvantageous for determining the area that the UE is heading for, the TA ID from the UE is such defined in an embodiment of the invention that the TA ID sent by the UE is a specific TA ID in the old TA List, for example, the TA ID of the TA where the UE is located when the area covered by the old TA List is visited for the last time, i.e. the Last Visited Registered TAI.

Since the UE Context is stored in the MME, the MME can store the history information above to its stored DE Context after allocating a TA List for the UE. Examples of storing the history information to the UE Context by the MME are described below, and an additional parameter is added as history information depending on actual application in particular embodiments.

After allocating the old TA List (i.e. the allocated TA List just preceding any new TA List is allocated) for the UE, MME 1 stores the allocated old TA List, the allocation time of the old TA List, and the TA ID of the TA where the UE is located when the old TA List is allocated, in the UE Context corresponding to the UE.

To allocate a new TA List for the UE, MME 2 calculates a time interval between the current time and the old allocation time when MME 1 allocates the old TA List that is obtained from the UE Context stored in MME 1, and determines a distance between the TA where the UE is currently located and the TA where the UE is located when the old TA List is allocated by MME 1, based on the TA ID of the TA where the UE is located when the old TA List is allocated that is obtained from the UE Context.

Subsequently, MME 2 estimates the movement speed of the UE based on both the time interval and the distance that are determined above. If the UE covers a relatively long distance within a relatively short time interval, the movement speed of the DE is determined as high, and thus a new TA List with a relatively large coverage is allocated for the UE; otherwise, if the UE covers a relatively short distance within a relatively long time interval, the movement speed of the UE is determined as low, and thus a TA List with a relatively small coverage is allocated for the UE.

If the UE does not move directly from the old TA where the UE is located when the old TA List is allocated by MME 1 to the TA where the UE is currently located (for example, the UE moves from the old TA to another TA and then to the current allocated TA), an error may be present in the movement speed of the UE determined above. In this case, the movement speed is adjusted based on the old TA List allocated by MME 1 to decrease the error. For example, a weight is determined with reference to the allocated old TA List, and the movement speed is multiplied by the weight to decrease the error in the movement speed. Therefore, the old TA List allocated by MME 1 is required to be added to the UE Context. The significance of the old TA List allocated by MME 1 is related to the time interval obtained above. Typically, the smaller the time interval is, the more significant the old TA List is; vice versa, the longer the time interval is, the less significant the old TA List is. For example, when the time interval obtained above is one week, the old TA List is substantially of no significance, and generally cannot be used for estimating the movement speed of the UE; and when the time interval obtained above is five minutes, the old TA List is referred to for the calculating of the movement speed of the UE.

For the calculation of the time interval above, the time of MME 1 needs to be in synchronization with that of MME 2, otherwise, the time interval calculated may be inaccurate. However, such synchronization need not have a high precision, and synchronization in the order of a second satisfies embodiments of the invention. Various manners can be used for synchronization in the prior art, for example, the synchronization in the order of a second is implemented through the Network Time Protocol (NTP) defined by the Internet Engineering Task Force (IETF).

As describe above, to enable MME 2 to determine whether it is necessary to refer to the old TA List for the allocation of a new TA List for the UE with respect to a certain range of time interval, it is possible to define such a rule that MME 2 refers to the old TA List for the allocation of a new TA List for the UE if the obtained time interval is shorter than or equal to a preset time interval, and otherwise, MME 2 does not refer to the old TA List that has been allocated by MME 1. Here, the preset time interval is set by the operator on its own initiative in various ways, for example, the preset time interval is set as N*MRC_Timer, where N denotes a natural number and MRC_Timer denotes the time set by a Mobile Reachable timer of the DE, and the operator sets the value of N and MRC_Timer depending on a practical application.

In addition to the history information as described above, a movement track of the UE is important for allocating a new TA List for the UE. Currently, a single TA ID is sent by the UE to the new MME and it is impossible to obtain an accurate movement track of the UE by using the single TA ID. However, the TA ID to be sent by the UE is further such defined that a specific TA ID that facilitates the determination of the movement direction of the UE is sent by the UE, for example, the UE sends the TA ID of the TA located for the last time within the old TA List allocated by MME 1, i.e. the Last Visited Registered TM, so that the movement direction of the UE is determined by MME 2 by combining the designated TA ID sent by the UE and the TA ID of the TA where the UE is currently located. Particularly in an embodiment of the invention, when moving within the areas covered by the old TA List, the UE stores the TA ID of each TA where it accesses into its Universal Subscriber Identity Module (USIM) or nonvolatile storage of the DE although no TA update occurs, and replaces a previous TA ID if the previous TA ID is already stored. In this way, when a TA update procedure is initiated by the UE, the TA ID currently stored in the UE is the TA ID of the TA where the UE is located when the old TA List is accessed for the last time, and MME 2 determines the movement direction of the UE by referring to both the designated TA ID provided by the UE and the TA ID of the TA where the UE is currently located, thereby facilitating the allocation of a new relatively appropriate TA List for the UE.

FIG. 1 is a schematic diagram showing the TA List according to an embodiment of the invention. An embodiment of allocating a new TA List is described below in connection with FIG. 1.

When a UE moves to an area TA1, MME 1 allocates a TA List of "TA1, TA2, . . . , TA6" for the UE, and then adds the allocated TA List, the allocation time of the TA List and the TA ID of the TA where the UE is located when the TA List is allocated (i.e. TA1) to the UE Context corresponding to this UE; in addition, the UE stores the TA ID of the TA where it is currently located (i.e. TA1) into its USIM or nonvolatile storage, and stores the allocated TA List into its volatile storage such as a memory.

Since the network side allocates a new TA List for a DE when the UE attaches to the network again after its detachment (such as power off), it is preferable in the embodiment of the invention to store the allocated TA List into the volatile storage of the UE, that is, the TA List does not exist in the UE after the detachment of the UE. Alternatively, the TA List is stored in the nonvolatile storage of the UE.

When moving out of the area TA1, the UE determines whether the TA ID of the TA where it moves to is within the old TA List, if so, the UE does not initiate a TA update and stores the TA ID of the TA where it moves to into its USIM or nonvolatile storage to replace the existing TA 1. If the UE determines that the TA ID of the TA where it moves to is not within the old TA List, a TA update procedure is initiated, after the TA Update procedure is finished, the UE stores the TA ID of the TA where it moves to into its USIM or nonvolatile storage after the TA update.

For example, when moving to an area TA2, the DE determines that TA2 is within the old TA List and conducts no TA update, and stores the TA ID of the TA where it is currently located (i.e. TA2) into its USIM or nonvolatile storage to replace TA1.

Likewise, when the UE moves further to an area TA3, the UE stores TA3 into its USIM or nonvolatile storages to replace TA2.

When moving further to an area TA7, the UE determines that TA7 is not within the old TA List including TA1-TA6, and then sends to MME 2 a TA Update Request message, which contains a TA ID (i.e. TA3) stored in the USIM or nonvolatile storage of the UE and an EPS Temporary Mobile Station Identity (S-TMSI).

After receiving the TA Update Request message from the UE, MME 2 locates MME 1 according to the TA3 and S-TMSI contained in the message, obtains the UE Context corresponding to the UE from MME 1, and extracts the old TA List (i.e. TA1-TA6), the allocation time of the old TA List and the TA ID of the TA where the UE is located when the old TA List is allocated from the UE Context.

In the case that MME 2 and MME 1 are the same MME physically, after receiving the TA Update Request message from the UE, MME 2 locates MME 1 according to the S-TMSI contained in the message, searches for the UE Context corresponding to the UE in the located MME 1, and extracts the old TA List (i.e. TA1-TA6), the allocation time of the old TA List and the TA ID of the TA where the UE is located when the old TA List is allocated from the UE Context.

Subsequently, MME 2 allocates a new TA List for the UE according to the history information extracted as described above as follows.

According to the current time and the extracted allocation time of the old TA List allocated by MME 1, MME 2 calculates the time interval between the current time and time when the old TA List is allocated by MME 1, and determines whether the time interval is shorter than the preset time interval; if so, MME 2 allocates a new TA List for the UE with reference to the extracted old TA List; otherwise, MME 2 allocates a new TA List for the UE without reference to the extracted old TA List. It is assumed that the calculated time interval is shorter than the preset time interval in the embodiment, and the extracted old TA List is used for the allocation of the new TA List.

Then, MME 2 estimates the movement speed of the UE by using the distance between the areas TA1 and TA7 (for example, the distance is calculated from related parameters configured by the operator) and the calculated time interval, determines a weight according to the extracted old TA List, and adjusts the estimated movement speed based on the determined weight to obtain a more accurate movement speed.

If the adjusted movement speed is relatively high, it is determined to allocate a relatively large coverage for the UE; otherwise, a relatively small coverage is allocated for the UE. It is assumed that the determined movement speed of the UE is low in the embodiment, and hence MME 2 determines to allocate a relatively small coverage of Tracking Areas, e.g. three TAs, for the UE.

Subsequently, according to the area TA3 provided by the UE in the TA update request message and TA7 where the UE initiates the TA update procedure, MME 2 determines that the UE is moving in an inclining direction from the area TA3 to area TA7, and hence allocates Tracking Areas for the UE along such direction.

In this case, MME 2 allocates a new TA List, i.e. a TA List2 of "TA3, TA7, TA8", for the UE.

After allocating TA List2 for the UE, MME 2 adds the allocated TA List2, the allocation time of the TA List2, and the TA ID of the TA (i.e. TA7) where the UE is located when the TA List2 is allocated to the UE Context, replacing the existing history information.

Additionally, the UE determines that TA7 is contained in the new allocated TA List2, stores TA7 in the USIM or non-volatile storage of the UE to replace TA3, and stores the TA List2 into the memory of the UE to replace the old TA List allocated by MME 1 previously.

Thus, the allocation of the new TA List is completed.

Figure 2:
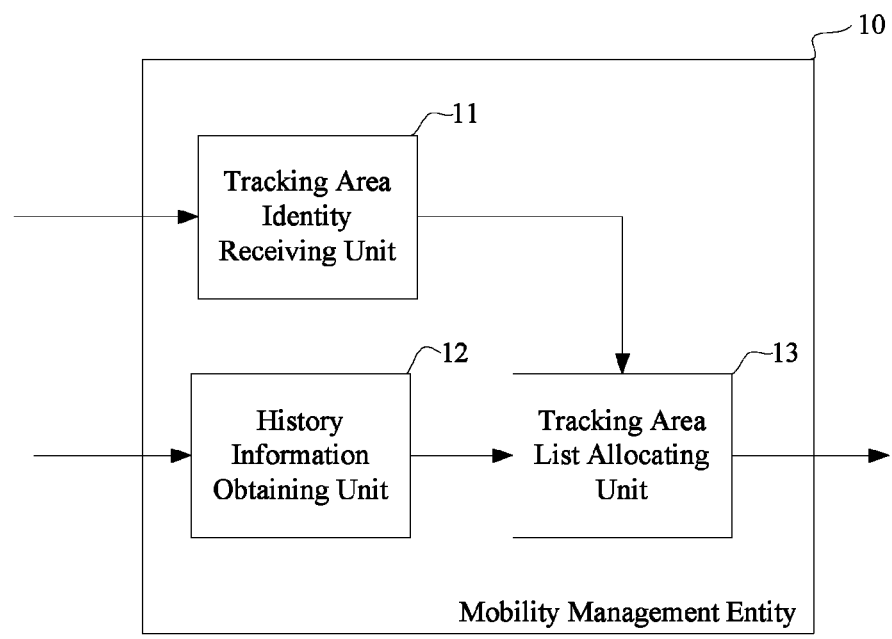
FIG. 2 is a schematic diagram showing the structure of a Mobility Management Entity according to an embodiment of the invention.

Corresponding to the method for allocating the TA List described above, an embodiment of the invention further provides a Mobility Management Entity. FIG. 2 is a schematic diagram showing the structure of the Mobility Management Entity according to an embodiment of the invention, as shown, the Mobility Management Entity 10 includes:

a Tracking Area Identity receiving unit 11 which is adapted to receive a designated TA ID from a UE;

a history information obtaining unit 12 which is adapted to obtain history information when the old TA List is allocated from a old Mobility Management Entity allocating the old TA List; and a Tracking Area List allocating unit 13 which is adapted to allocate a new TA List for the UE according to the obtained history information and the received designated TA ID.

If the old TA List, the allocation time of the old TA List and the TA ID of the TA where the UE is located when the old TA List is allocated are included in the history information, the Tracking Area List allocating unit 13 estimates the movement speed of the UE according to the allocation time and the TA ID when the new TA List is allocated, and determines the moving direction of the UE according to the TA ID of the TA where the UE is currently located and the designated TA ID sent by the UE. Thus, the Tracking Area List allocating unit 13 includes:

a subunit adapted to determine the movement direction of the UE according to the TA ID of the TA where the UE is currently located and the designated TA ID sent by the UE;

a subunit adapted to estimate the movement speed of the UE according to the obtained history information; and a subunit adapted to allocate a new TA List according to the determined movement direction of the UE and the estimated movement speed of the UE.

The subunit adapted to estimate the movement speed of the UE according to the obtained history information includes:

a subunit adapted to calculate a time interval between the current time and the allocation time when the new Tracking Area List is allocated;

a subunit adapted to calculate a distance between a Tracking Area where the UE is currently located and a Tracking Area where the UE is located when the old Tracking Area List is allocated, according the Tracking Area Identity of the Tracking Area where the UE is currently located and the Tracking Area Identity of the Tracking Area where the UE is located when the old Tracking Area List is allocated; and a subunit adapted to estimate the movement speed of the UE according to the calculated time interval and the estimated distance.

Additionally, since the UE might move to the same TA again during the movement within the areas covered by the old TA List, an error may be present in the movement speed of the UE estimated according to the above allocation time and the TA ID of the TA where the UE is located at the allocation time. In this case, the movement speed is adjusted based on the old TA List by the subunit which is adapted to estimate the movement speed of the UE according to the obtained history information.

However, since the significance of the old TA List is in inverse proportion to the time interval between the allocation time of the old TA List and the current time, it is necessary to calculate the time interval to determine the significance of the old TA List, and further to adjust the movement speed described above more accurately. Thus, the subunit adapted to estimate the movement speed of the UE according to the obtained history information further includes:

a subunit adapted to determine whether the calculated time interval is shorter than the preset time interval;

a subunit adapted to determine a weight used for adjusting the movement speed of the UE based on the old Tracking Area List allocated for the UE if the calculated time interval is shorter than the preset time interval; and a subunit adapted to adjust the estimated movement speed of the UE by using the determined weight.

Here, the preset time interval is set according to a practical implementation, and is set as, but not limited to N*MRC_Timer, where N denotes a natural number and MRC_Timer denotes a time parameter set by a Mobile Reachable Timer of the UE.

Further, after allocating a new TA List for the UE, the MME needs to store the related history information to the UE Context corresponding to the UE.

Figure 3:
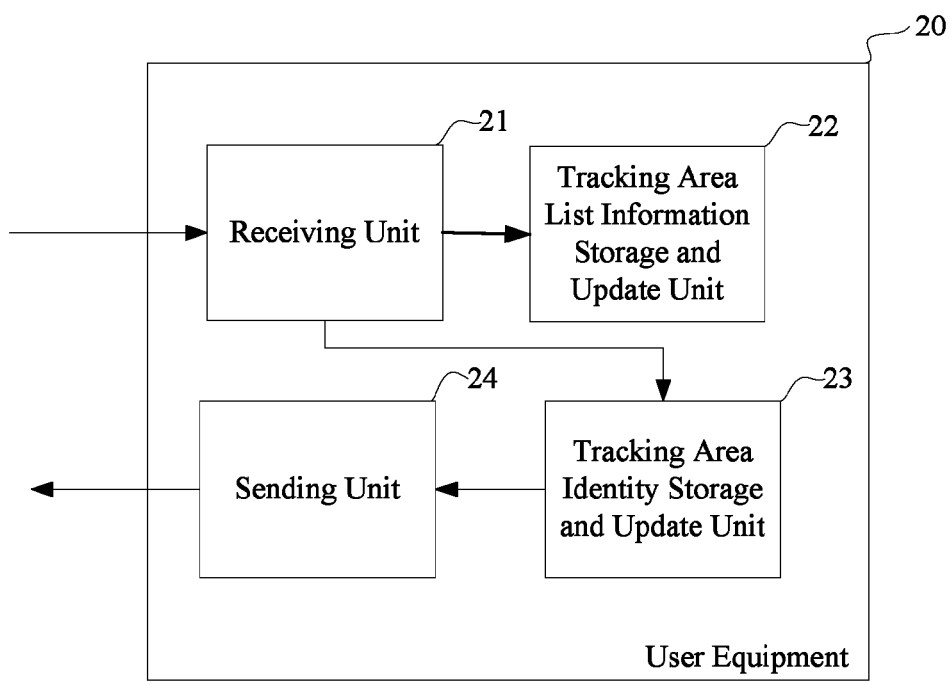
FIG. 3 is a schematic diagram showing the structure of a User Equipment according to an embodiment of the invention.

An embodiment of the invention further provides a User Equipment. FIG. 3 is a schematic diagram showing the structure of a User Equipment according to an embodiment of the invention, as shown, the User Equipment 20 includes:

a receiving unit 21, which is adapted to receive a Tracking Area Identity of the Tracking Area where the User Equipment is currently located, and receive a Tracking Area List allocated by a Mobility Management Entity;

a Tracking Area List information storage and update unit 22, which is adapted to store and update the Tracking Area List allocated by the Mobility Management Entity according to the Tracking Area List received by the receiving unit 21;

a Tracking Area Identity storage and update unit 23, which is adapted to store and update a Tracking Area Identity of the Tracking Area where the User Equipment is currently located according to each Tracking Area Identity received by the receiving unit 21, during the movement of the User Equipment within Tracking Areas covered by the old allocated Tracking Area List; and a sending unit 24, which is adapted to send to the Mobility Management Entity the Tracking Area Identity stored and updated by the Tracking Area Identity storage and update unit 23.

The TA List stored and updated by the Tracking Area List information storage and update unit 22 is stored in a volatile storage (such as a memory) or a nonvolatile storage of the User Equipment. Further, since the TA List is no longer used after the detachment or power off of the User Equipment, it is preferable to store the received TA List in the volatile storage such as the memory of the User Equipment, and the stored TA List is lost automatically when the User Equipment is powered off.

In either case that the TA List is stored in a volatile storage or a nonvolatile storage, the UE deletes the TA List or indicate the TA List as invalid, and the TA List is no longer used. Accordingly in this case, the Tracking Area List information storage and update unit 22 includes:

a subunit adapted to store the Tracking Area List in the volatile or nonvolatile storage; and a subunit adapted to indicate the Tracking Area List stored in the volatile or nonvolatile storage as invalid or delete the Tracking Area List when the User Equipment is detached or powered off The Tracking Area Identity storage and update unit 23 stores the TA ID into the USIM or nonvolatile storage of the UE.

It shall be noted that the above embodiments are merely used to illustrate the solution of the invention without limitation. While the invention has been described with reference to the embodiments, it will be appreciated by those skilled in the art that various modifications and alterations may be made to the solutions in the embodiments of the invention without departing from the scope of the invention.

The invention claimed is:

1. A method for allocating a new Tracking Area List for a User Equipment, comprising:
   receiving a designated Tracking Area Identity from the User Equipment;
   obtaining history information when an old Tracking Area List is allocated from an old Mobility Management Entity allocating the old Tracking Area List; and
   allocating a new Tracking Area List for the User Equipment according to the obtained history information and the received designated Tracking Area Identity;
   wherein allocating the new Tracking Area List for the User Equipment comprises:
      determining a movement direction of the User Equipment according to a Tracking Area Identity of the Tracking Area where the User Equipment is currently allocated and the received designated Tracking Area Identity;
      estimating a movement speed of the User Equipment according to the obtained history information, and
      allocating the new Tracking Area List for the User Equipment according to the determined movement direction and the estimated movement speed of the User Equipment.

2. The method of claim 1, wherein the designated Tracking Area Identity from the User Equipment is the Tracking Area Identity of the Tracking Area where User Equipment is located when a Tracking Area having a TA ID within the old Tracking Area List is accessed for the last time.

3. The method of claim 2, wherein the User Equipment stores and updates the Tracking Area Identity of each Tracking Area to which the User Equipment moves during its the movement within the Tracking Areas having identities within the old Tracking Area List.

4. The method of claim 3, wherein the User Equipment stores the Tracking Area Identity of the Tracking Area to which it moves into its Universal Subscriber Identity Module or nonvolatile storage.

5. The method of claim 1, wherein the history information comprises: allocation time when the old Tracking Area List is allocated and a Tracking Area Identity of the Tracking Area where the User Equipment is located when the old Tracking Area List is located.

6. The method of claim 5, wherein estimating the movement speed of the User Equipment according to the obtained history information comprises:
   calculating a time interval between the current time and the allocation time when the old Tracking Area List is allocated;
   calculating a distance between a Tracking Area where the User Equipment is currently located and a Tracking Area where the User Equipment is located when the old Tracking Area List is allocated, according the Tracking Area Identity of the Tracking Area where the User Equipment is currently located and the Tracking Area Identity of the Tracking Area where the User Equipment is located when the old Tracking Area List is allocated; and
   estimating the movement speed of the User Equipment according to the calculated time interval and the estimated distance.

7. The method of claim 6, wherein the history information further comprises the old Tracking Area List allocated to the User Equipment.

8. The method of claim 7, wherein estimating the movement speed of the User Equipment according to the obtained history information further comprises:
   determining whether the calculated time interval is shorter than the preset time interval;
   determining a weight used for adjusting the movement speed of the User Equipment based on the old Tracking Area List allocated for the User Equipment if the calculated time interval is shorter than the preset time interval; and
   adjusting the estimated movement speed of the User Equipment by using the determined weight.

9. The method of claim 8, wherein the preset time interval is N*MRC_Timer, wherein N denotes a natural number and MRC_Timer denotes a time parameter set by a Mobile Reachable Timer of the User Equipment.

10. The method of claim 1, wherein after allocating the old Tracking Area List for the User Equipment, a Mobility Management Entity allocating the old Tracking Area List stores the history information into User Equipment Context corresponding to the User Equipment.

11. The method of claim 1, wherein the User Equipment stores the new Tracking Area List allocated into a volatile or nonvolatile storage, and indicates the Tracking Area List as invalid or deletes the Tracking Area List after the User Equipment is detached or powered off.

12. A Mobility Management Entity, comprising:
   a Tracking Area Identity receiving unit adapted to receive a designated Tracking Area Identity from a User Equipment;
   a history information obtaining unit adapted to obtain history information when the old Tracking Area List is allocated from the old Mobility Management Entity allocating the old Tracking Area List; and a Tracking Area List allocating unit adapted to allocate a new Tracking Area List for the User Equipment according to the obtained history information and the received designated Tracking Area Identity;

wherein the Tracking Area List allocating unit comprises:
  a subunit adapted to determine a movement direction of the User Equipment according to the Tracking Area Identity of the Tracking Area where the User Equipment is currently located and the designated Tracking Area Identity sent by the User Equipment;
  a subunit adapted to estimate the movement speed of the User Equipment according to the obtained history information; and
  a subunit adapted to allocate a new Tracking Area List according to the determined movement direction of the User Equipment and the estimated movement speed of the User Equipment.

13. The Mobility Management Entity of claim 12, wherein the history information obtained by the history information obtaining unit comprises: allocation time when the old Tracking Area List is allocated and a Tracking Area Identity of the Tracking Area where the User Equipment is located when the old Tracking Area List is located.

14. The Mobility Management Entity of claim 13, wherein the subunit adapted to estimate the movement speed of the User Equipment according to the obtained history information comprise:
  a subunit adapted to calculate a time interval between the current time and the allocation time when the old Tracking Area List is allocated;
  a subunit adapted to calculate a distance between a Tracking Area where the User Equipment is currently located and a Tracking Area where the User Equipment is located when the old Tracking Area List is allocated, according the Tracking Area Identity of the Tracking Area where the User Equipment is currently located and the Tracking Area Identity of the Tracking Area where the User Equipment is located when the old Tracking Area List is allocated; and
  a subunit adapted to estimate the movement speed of the User Equipment according to the calculated time interval and the estimated distance.

15. The Mobility Management Entity of claim 14, wherein the history information obtained by the history information obtaining unit further comprises: the old Tracking Area List allocated to the User Equipment, and the subunit adapted to estimate the movement speed of the User Equipment according to the obtained history information further comprises:
  a subunit adapted to determine whether the calculated time interval is shorter than the preset time interval;
  a subunit adapted to determine a weight used for adjusting the movement speed of the User Equipment based on the old Tracking Area List allocated for the User Equipment if the calculated time interval is shorter than the preset time interval; and
  a subunit adapted to adjust the estimated movement speed of the User Equipment by using the determined weight.

* * * * *